United States Patent
Hu et al.

(10) Patent No.: US 12,148,235 B2
(45) Date of Patent: Nov. 19, 2024

(54) POSTURE EVALUATING APPARATUS, METHOD AND SYSTEM

(71) Applicant: GENESYS LOGIC, INC., New Taipei (TW)

(72) Inventors: Shi-Ming Hu, New Taipei (TW); Hsueh-Te Chao, New Taipei (TW)

(73) Assignee: GENESYS LOGIC, INC., New Taipei (TW)

( * ) Notice: Subject to any disclaimer, the term of this patent is extended or adjusted under 35 U.S.C. 154(b) by 362 days.

(21) Appl. No.: 17/739,183

(22) Filed: May 9, 2022

(65) Prior Publication Data
US 2022/0392246 A1  Dec. 8, 2022

(30) Foreign Application Priority Data
Jun. 4, 2021  (TW) .................. 110120432

(51) Int. Cl.
*G06V 40/10* (2022.01)
*G06T 7/73* (2017.01)
*G06V 10/82* (2022.01)

(52) U.S. Cl.
CPC .............. *G06V 40/103* (2022.01); *G06T 7/73* (2017.01); *G06V 10/82* (2022.01); *G06T 2207/30196* (2013.01)

(58) Field of Classification Search
None
See application file for complete search history.

(56) References Cited

U.S. PATENT DOCUMENTS

2020/0410220 A1  12/2020  Mehl et al.
2021/0085240 A1   3/2021  Pena et al.

FOREIGN PATENT DOCUMENTS

CN   105307017   2/2016
CN   111568438   8/2020

OTHER PUBLICATIONS

Translation of CN 105307017 (Year: 2016).*
Artificial Intelligence Institute, "MediaPipe integrates face recognition, human pose assessment, and human hand detection models", with English translation thereof, retrieved on Jan. 19, 2021, Available at: https://www.163. com/dy/article/FVTB2PSE0531PF2O. html.

* cited by examiner

*Primary Examiner* — Lennin R RodriguezGonzalez
(74) *Attorney, Agent, or Firm* — JCIPRNET

(57) ABSTRACT

A posture evaluating apparatus, method, and system are provided. An image under test is captured by using an image capturing apparatus. Multiple key points in the image under test are identified. The key points correspond to multiple positions located on the main body and include first and second key point groups. A position of the first key point group is obtained, and a first geometric relation is determined via the association of the first key point group. The relative position between the main body and the image capturing apparatus is determined according to the first geometric relation or the number of the key points. Each relative position has a corresponding default geometric relation. The default geometric relation and a second geometric relation formed by the association of the second key point group are compared, and a compared result is generated.

20 Claims, 11 Drawing Sheets

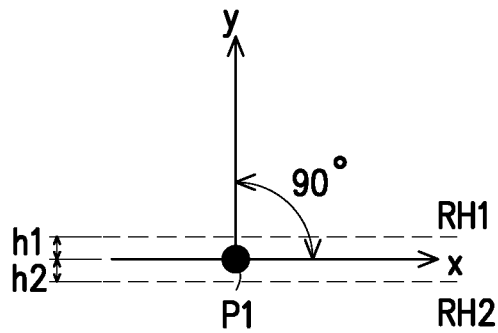
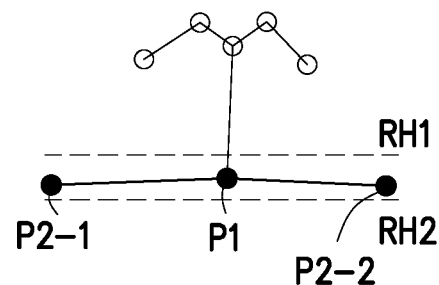
FIG. 8A  FIG. 8B
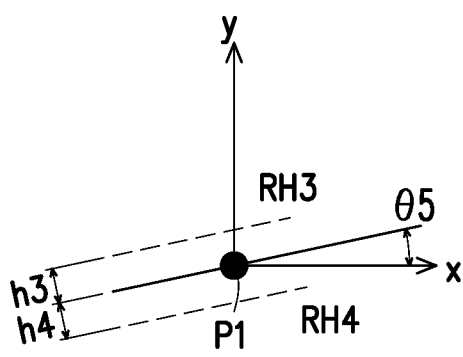
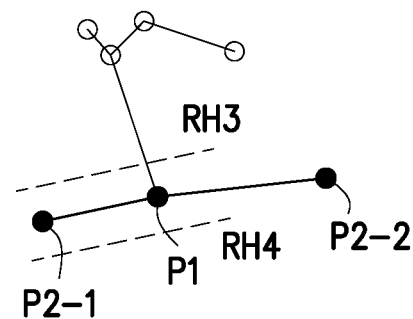
FIG. 9A  FIG. 9B

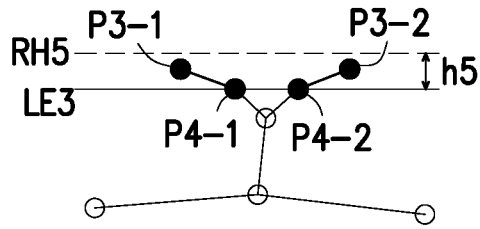
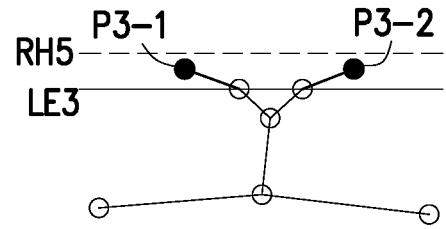
FIG. 14A             FIG. 14B
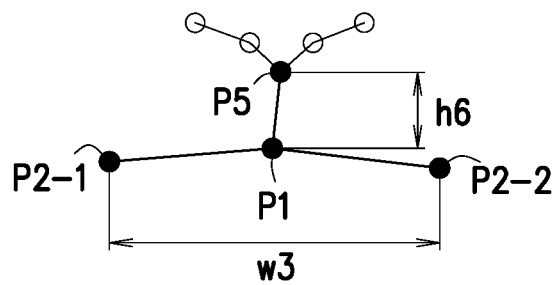
FIG. 15
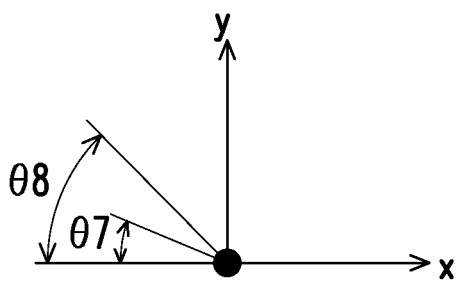
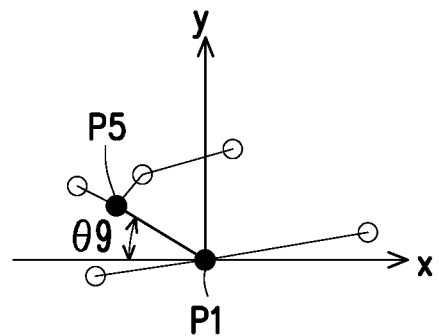
FIG. 16A             FIG. 16B

POSTURE EVALUATING APPARATUS, METHOD AND SYSTEM

CROSS-REFERENCE TO RELATED APPLICATION

This application claims the priority benefit of Taiwan application serial no. 110120432, filed on Jun. 4, 2021. The entirety of the above-mentioned patent application is hereby incorporated by reference herein and made a part of this specification.

BACKGROUND

Technical Field

The disclosure relates to an image recognition technology, and particularly relates to an image-based posture evaluating apparatus, method, and system.

Description of Related Art

Poor posture may bring muscle, bone soreness, or other negative effects. For example, sitting with a hunchback for a long time may cause stiffness in lower back muscles, weakness in the abdomen or buttocks, and tight hip joints, among many others. Although the prior art is capable of detecting the depths of human body parts through ultrasonic ranging to estimate a human body posture accordingly, the evaluation result is still relatively rough and even inaccurate. Therefore, the evaluation of human posture still has room for improvement.

SUMMARY

The disclosure is directed to a posture evaluating apparatus, method, and system, which are adapted to determine a posture based on a position relation between multiple key points in an image, thereby improving the accuracy and efficiency of evaluation.

An embodiment of the disclosure provides a posture evaluating method includes (but is not limited to) following steps: an image under test is captured by using an image capturing apparatus. A plurality of key points in the image under test are identified. The key points correspond to a plurality of positions of a main body in the image under test and include a first key point group and a second key point group. A position of the first key point group is obtained, and a first geometric relation is defined via association of the first key point group. A relative position between the main body and the image capturing apparatus is determined according to the first geometric relation. Each relative position has a corresponding default geometric relation. The default geometric relation and a second geometric relation formed by association of the second key point group are compared to generate a comparison result.

An embodiment of the disclosure provides a posture evaluating apparatus including (but is not limited to) a memory and a processor. The memory stores a program code. The processor is coupled to the memory. The processor loads and executes the program code to identify a plurality of key points in an image under test, obtain a position of a first key point group, define a first geometric relation via association of the first key point group, determine a relative position between the main body and the image capturing apparatus according to the first geometric relation, and compare a default geometric relation and a second geometric relation formed by association of a second key point group to generate a comparison result. The key points correspond to a plurality of positions of a main body in the image under test and include a first key point group and a second key point group. Each relative position has a corresponding default geometric relation.

An embodiment of the disclosure provides a posture evaluating system including (but is not limited to) an image capturing apparatus, a memory, and a processor. The image capturing apparatus captures an image under test. The memory stores a program code. The processor is coupled to the memory and the image capturing apparatus. The processor loads and executes the program code to identify a plurality of key points in the image under test, obtain a position of a first key point group, define a first geometric relation via association of the first key point group, determine a relative position between the main body and the image capturing apparatus according to the first geometric relation, and compare a default geometric relation and a second geometric relation formed by association of a second key point group to generate a comparison result. The key points correspond to a plurality of positions of a main body in the image under test and include a first key point group and a second key point group. Each relative position has a corresponding default geometric relation.

Based on the above description, according to the posture evaluating apparatus, method and system of the embodiments of the disclosure, the relative position between the main body and the image capturing apparatus is determined based on the position relation of the key points of the main body in the image under test, and it is determined whether the main body is in a normal posture according to the corresponding relative position. In this way, the accuracy of posture evaluation is improved, and the identification efficiency is improved.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

FIG. 8A and FIG. 8B are schematic diagrams of front side recognition according to an embodiment of the disclosure.

FIG. 9A and FIG. 9B are schematic diagrams of oblique profile recognition according to an embodiment of the disclosure.

FIGS. 14A and 14B are schematic diagrams of normal posture recognition of the front side according to another embodiment of the disclosure.

FIG. 15 is a schematic diagram of normal posture recognition of the front side according to another embodiment of the disclosure.

FIG. 16A and FIG. 16B are schematic diagrams of normal posture recognition of an oblique profile according to an embodiment of the disclosure.

DESCRIPTION OF THE EMBODIMENTS

Figure 1:
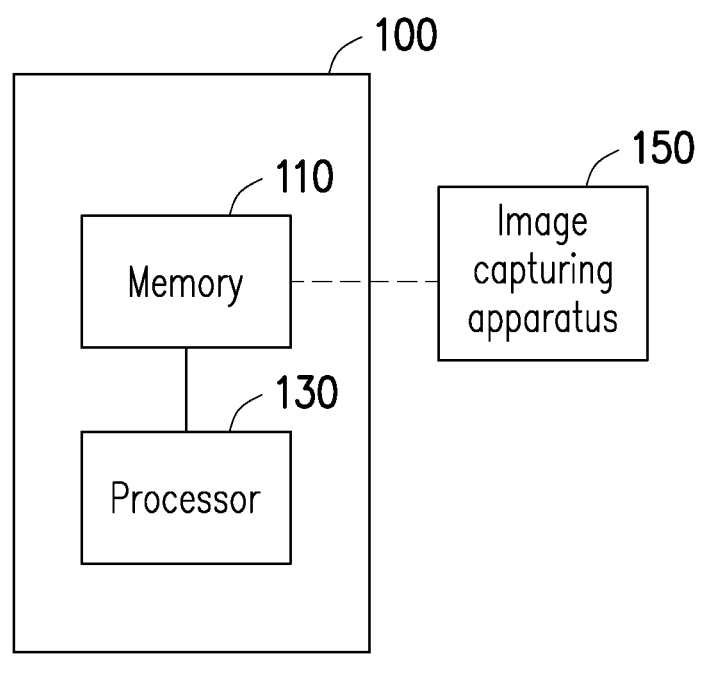
FIG. 1 is a component block diagram of a posture evaluating system according to an embodiment of the disclosure.

FIG. 1 is a component block diagram of a posture evaluating system 1 according to an embodiment of the disclosure. Referring to FIG. 1, the posture evaluating system 1 includes (but is not limited to) a posture evaluating apparatus 100 and an image capturing apparatus 150.

The posture evaluating apparatus 100 includes a memory 110 and a processor 130. The posture evaluating apparatus 100 may be a desktop computer, a notebook computer, a smart phone, a tablet computer, a server, a medical testing instrument, a smart desk lamp, a smart office/reading device, or other computing devices.

The memory 110 may be any type of fixed or removable random access memory (RAM), read-only memory (ROM), flash memory (flash memory), conventional hard disk drive (HDD), solid-state drive (SSD) or similar components. In one embodiment, the memory 110 is used to store program codes, software modules, configurations, data or files.

The processor 130 is coupled to the memory 110, and the processor 130 may be a central processing unit (CPU), a graphics processing unit (GPU), or other programmable general purpose or special purpose microprocessor, a digital signal processor (DSP), a programmable controller, a field programmable logic gate array (FPGA), a special application integrated circuit (ASIC), a neural network accelerator or other similar components or a combination of the above components. In an embodiment, the processor 130 is used to perform all of or a part of tasks of the posture evaluating apparatus 100, and may load and execute various program codes, software modules, files, and data stored in the memory 110.

The image capturing apparatus 150 may be a camera, a video camera, a monitor, or a device with the similar function. In an embodiment, the image capturing apparatus 150 may be built-in or externally connected to a main body of the posture evaluating apparatus 100.

In an embodiment, the image capturing apparatus 150 may include an image sensor (for example, a charge coupled device (CCD), a complementary metal-oxide-semiconductor (CMOS), etc.), an optical lens, an image control circuit, an image processor and other components. In some embodiments, lens specifications (for example, an imaging aperture, a magnification, a focal length, an imaging viewing angle, an image sensor size, etc.) of the image capturing apparatus 150 and a quantity thereof may be adjusted according to actual requirements. For example, the image capturing apparatus 150 includes a fisheye lens, and an image processor thereof or the processor 130 may expand a fisheye image captured by the fisheye lens into a panoramic image. For another example, the image capturing apparatus 150 includes a wide-angle lens, and the image processor thereof or the processor 130 may correct a distortion of the image captured by the image sensor.

Hereinafter, various devices, components, and modules in the posture evaluating system 1 are used to describe the method of the embodiment of the disclosure. Each process flow of the method may be adjusted accordingly according to an actual implementation situation, but the disclosure is not limited thereto.

Figure 2:
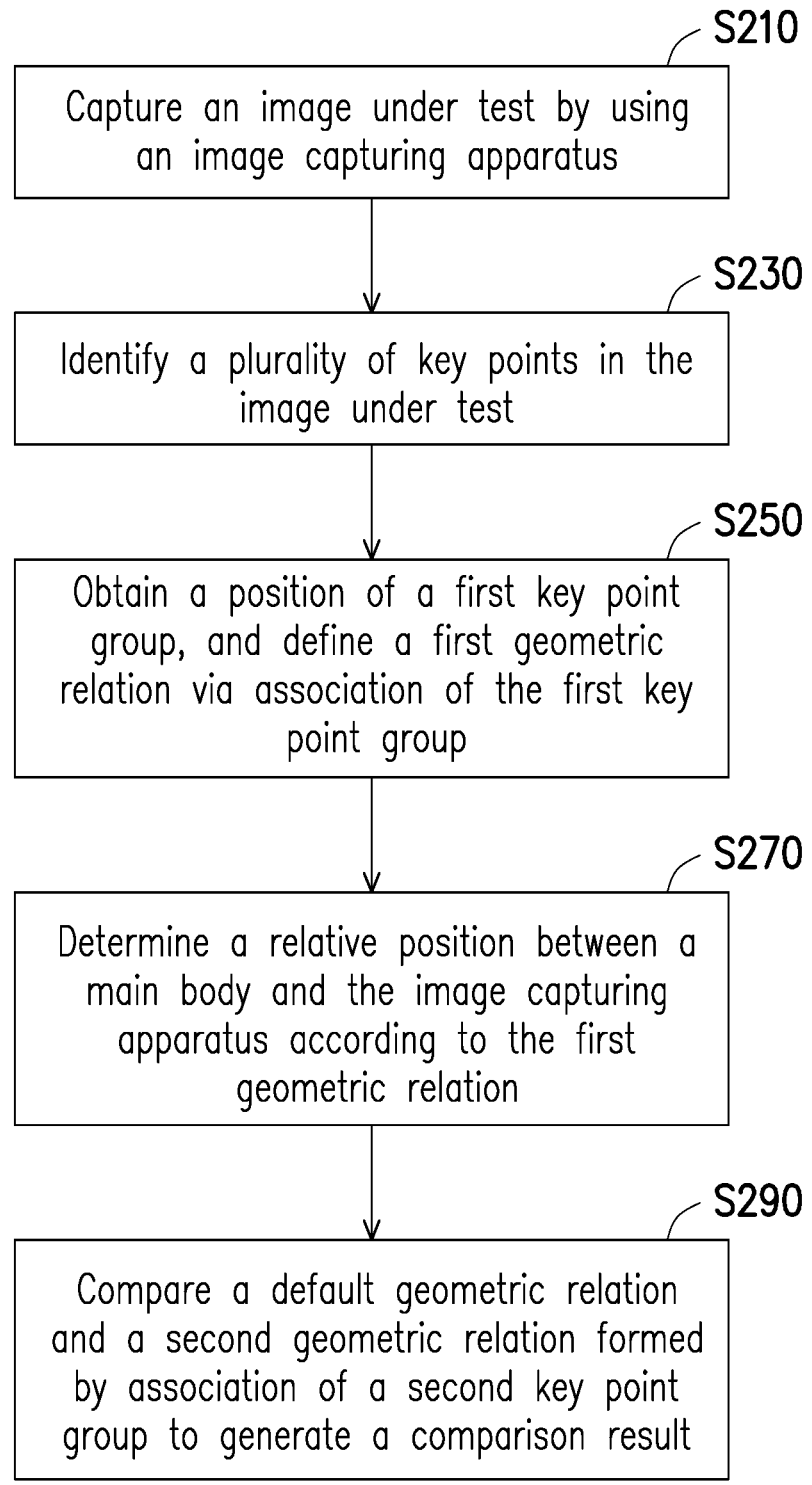
FIG. 2 is a flowchart illustrating a posture evaluating method according to an embodiment of the disclosure.

FIG. 2 is a flowchart illustrating a posture evaluating method according to an embodiment of the disclosure. Referring to FIG. 2, the processor 130 may use the image capturing apparatus 150 to capture an image under test (step S210). To be specific, the image under test is an image captured from a main body by using the image capturing apparatus 150 of the posture evaluating apparatus 100 or other external image capturing apparatuses. In an embodiment, the main body is a human body. In an embodiment, the image under test corresponds to an upper half body of the main body (for example, above a waist, shoulders, or a chest).

Figure 3A:
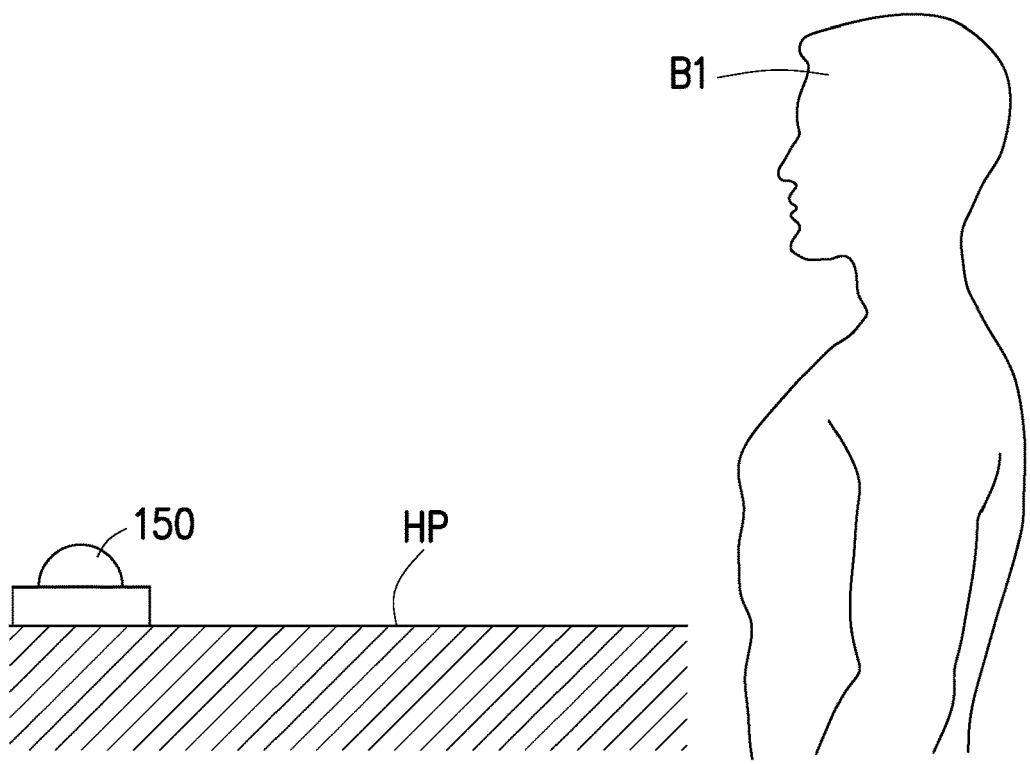
FIG. 3A to FIG. 3B are schematic diagrams of capturing an image of a main body according to an embodiment of the disclosure.
Figure 3B:
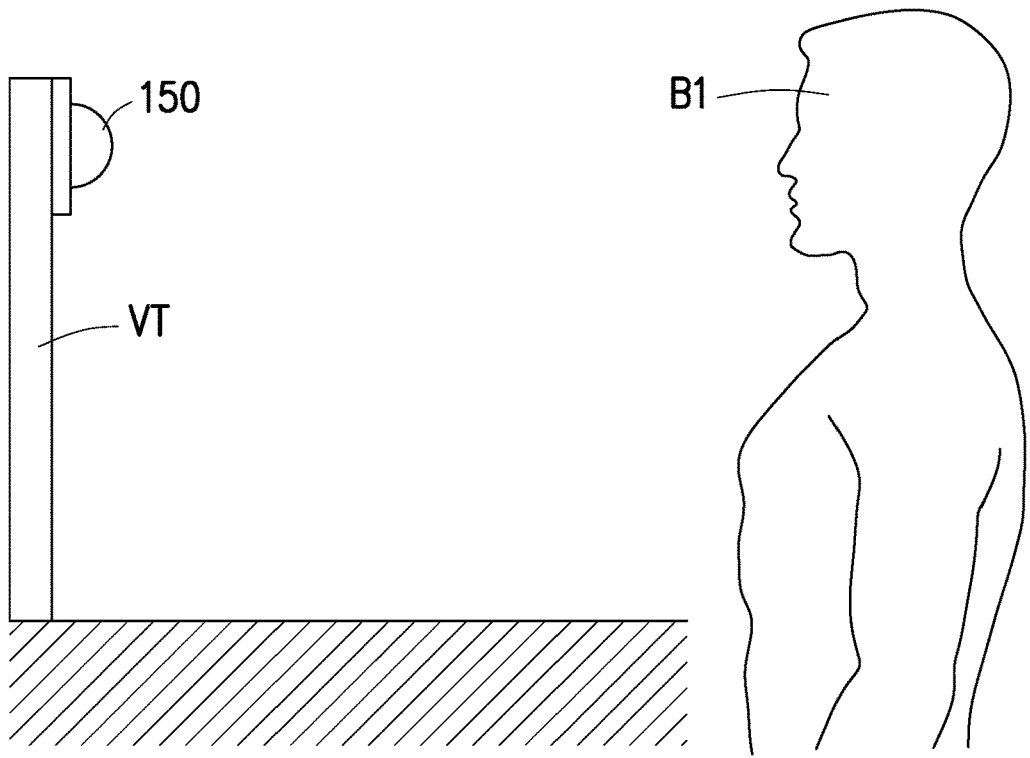

For example, FIG. 3A to FIG. 3B are schematic diagrams of capturing an image of a main body according to an embodiment of the disclosure. Referring to FIG. 3A, the image capturing apparatus 150 is placed on a horizontal plane HP (for example, a desktop), and a height of the horizontal plane HP is approximately between a chest and a waist of a main body B1. The image capturing apparatus 150 may be equipped with a fisheye lens to capture an upper half body of the main body B1.

Referring to FIG. 3B, the image capturing apparatus 150 is placed on a vertical surface VT (for example, a wall), and the height of the image capturing apparatus 150 is approximately located at a head portion of the main body B1. At this time, the image capturing apparatus 150 may be configured with a wide-angle lens or even a standard lens to capture the upper half body of the main body B1.

Figure 3C:
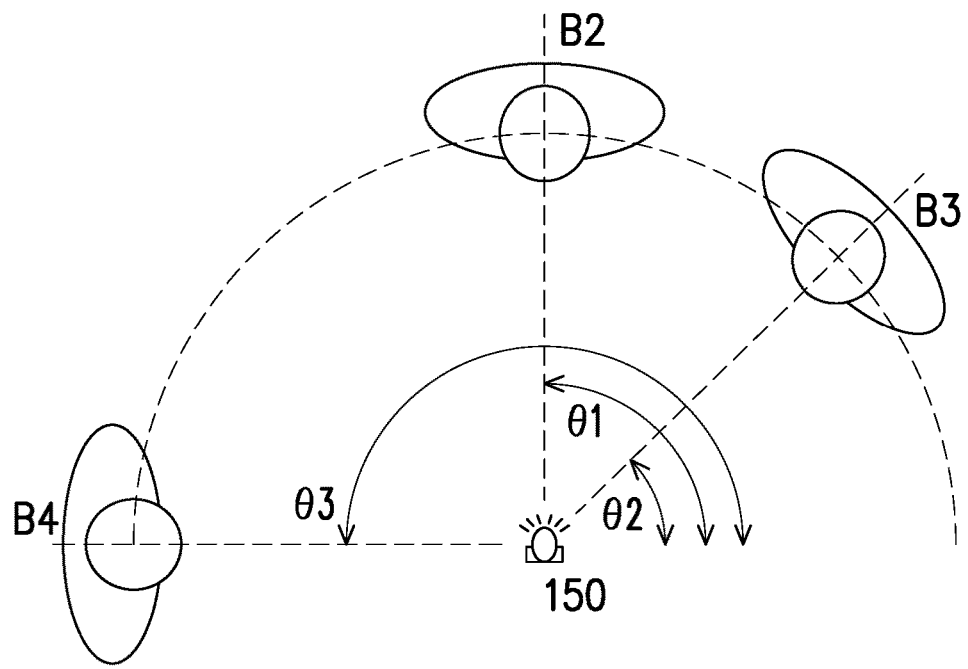
FIG. 3C is a schematic diagram of orientations of main bodies according to an embodiment of the disclosure.

FIG. 3C is a schematic diagram of orientations of main bodies according to an embodiment of the disclosure. Referring to FIG. 3C, it is assumed that the image capturing apparatus 150 is set on a desktop (as shown in FIG. 3A), and a field of view of the image capturing apparatus 150 covers at least 180 degrees. Relative positions of main bodies B2, B3, and B4 at an angle θ1 (for example, 90 degrees), an angle θ2 (for example, 45 degrees), and an angle θ3 (for example, 180 degrees) with respect to the image capturing device 150 are all within the field of view of the image capturing apparatus 150. In some situations, the field of view of the image capturing apparatus 150 may be affected by the desktop on which the main bodies are located, and only the upper half bodies of the main bodies B2, B3, B4 are captured. In other situations, the image capturing apparatus 150 may also be set to face a specific angle so that the field of view thereof only covers the shoulders or other specific parts of the main bodies B2, B3, B4.

It should be noted that the relative positions (for example, the angles θ1, θ2, θ3) between the main bodies B2, B3, B4 and the image capturing apparatus 150 shown in FIG. 3C are only illustrative, and there may still be other relative positions in actual situations, and this example is not intended to limit the embodiment of the disclosure.

In some embodiments, the processor 130 may cut the image under test and obtain specific parts of the main body. These specific parts are, for example, the head, neck and shoulders. Namely, when the original image under test corresponds to a whole body, a ¾ body, or other body proportions of the main body, the processor 130 may cut the original image under test to obtain the upper bodies or other body parts of the main bodies B1 to B4.

It should be note that a configuration position of the image capturing apparatus 150 may still be varied according to actual conditions. In some embodiments, shooting content of the image under test or the specific part of the main body may be changed according to actual needs. In other embodiments, the posture evaluating apparatus 100 may also obtain images captured by other image capturing apparatuses via the Internet or from a storage medium.

The processor 130 may identify a plurality of key points in the image under test (step S230). In an embodiment, the key points include positions of one or two eyes, one or two ears, a nose, a neck, and/or one or two shoulders. In other embodiments, the key point may be any organ, joint, edge of the main body, or a position extended from any of the foregoing. These key points are used for subsequent posture evaluation.

For key point identification, in one embodiment, the processor 130 may mark the key points in the image under test based on a neural network (NN). The neural network (which is also referred to as a quasi-neural network, an artificial neural network) may optimize its internal structure and/or parameters based on a learning method of mathematical statistics, and resolve problems related to artificial perception.

In an embodiment, the neural network is a deep learning neural network. A framework of the deep learning neural network includes an input layer, a hidden layer, and an output layer. In the input layer, a plurality of neurons receive a large amount of nonlinear input information. In the hidden layer, a plurality of neurons and links may form one or more layers, and each layer includes of a linear combination and a nonlinear activation function. In some embodiments, for example, a recurrent neural network may take an output of a certain layer in the hidden layer as an input of another layer. After the information is transmitted, analyzed, and/or weighed in the neuron links, a prediction result may be formed in the output layer. A training procedure of the neural network is to find parameters (for example, weight, bias, etc.) and links in the hidden layer.

In an embodiment, the neural network is a convolutional neural network (CNN). The convolutional neural network usually includes one or a plurality of convolutional layers and a fully connected layer (i.e., the aforementioned deep learning neural network) at the top, and may also include associated weights and a pooling layer. It should be noted that, in the convolutional layer, the neurons of each layer are arranged in a two-dimensional matrix, and a designated convolution kernel performs a convolution operation on each layer of input matrix to obtain a feature map.

In other embodiments, the neural network may also be OpenPose, Inception, GoogleNet, Alexnet or other network structures.

In an embodiment, the neural network is trained by learning samples marked with the key points. These learning samples have been marked with specific categories in one or more specific regions (for example, region of interest (ROI), bounding box, etc.) thereon. These categories are the key points that have been defined. The neural network may analyze the learning samples to obtain rules, and predict unknown data through the rules. In other words, the trained neural network may make an inference on an image under test, determine a ROI, a bounding box, or a circled region in the image under test based on a result of the inference, and accordingly mark key points and types thereof in these specific regions.

In other embodiments, the processor 130 uses such as Harr features, speeded up robust features (SURF), scale-invariant feature transform (SIFT), Adaboost or other image recognition and/or feature comparison techniques to identify the key points, and then mark the key points on the image under test.

Figure 4:
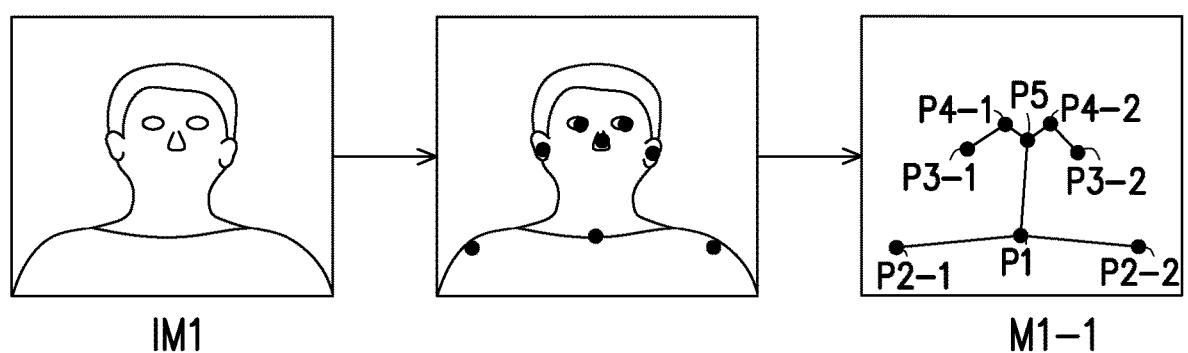
FIG. 4 is a schematic diagram of key point marks of a front side according to an embodiment of the disclosure.

For example, FIG. 4 is a schematic diagram of key point marks of a front side according to an embodiment of the disclosure. Referring to FIG. 3 and FIG. 4, it is assumed that the image capturing apparatus 150 shoots the main body B2 (with a front side facing the image capturing apparatus 150) located directly in front of the image capturing apparatus 150 in FIG. 3C to obtain an image IM1 under test. The processor 130 may identify a neck P1, shoulders P2-1, P2-2, ears P3-1, P3-2, eyes P4-1, P4-2, and a nose P5 from the image under test.

Figure 5:
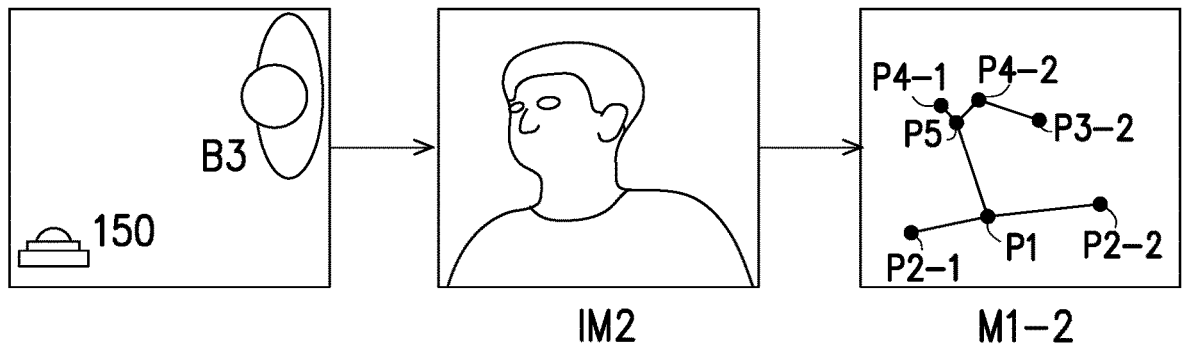
FIG. 5 is a schematic diagram of key point marks of an oblique profile according to an embodiment of the disclosure.

FIG. 5 is a schematic diagram of key point marks of an oblique profile according to an embodiment of the disclosure. Referring to FIG. 3C and FIG. 5, it is assumed that the image capturing apparatus 150 shoots the main body B3 (with a oblique profile facing the image capturing apparatus 150) located at the right front of the image capturing apparatus 150 in FIG. 3C to obtain an image IM2 under test. The processor 130 may identify the neck P1, the shoulders P2-1, P2-2, the ear P3-2, the eyes P4-1, P4-2, and the nose P5 from the image under test.

Figure 6:
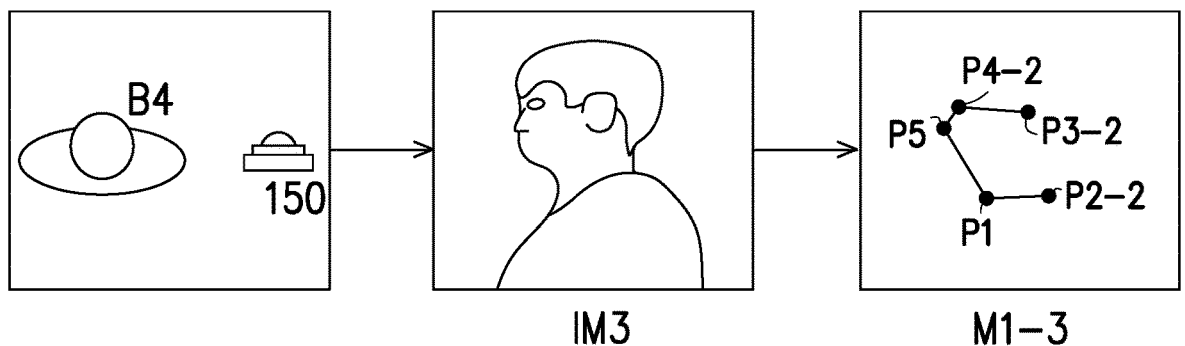
FIG. 6 is a schematic diagram of key point marks of a profile according to an embodiment of the disclosure.

FIG. 6 is a schematic diagram of key point marks of a profile according to an embodiment of the disclosure. Referring to FIG. 3C and FIG. 6, it is assumed that the image capturing apparatus 150 shoots the main body B4 (with a profile facing the image capturing apparatus 150) located on the left side of the image capturing apparatus 150 in FIG. 3C to obtain an image IM3 under test. The processor 130 may identify the neck P1, the shoulder P2-2, the ear P3-2, the eye P4-2, and the nose P5 from the image under test.

The processor 130 obtains a position of a first key point group in the key points, and defines a first geometric relation through association of the first key point group (step S250). To be specific, the key points include the first key point group and a second key point group. A part of or all of the key points may be used as the first key point group and/or the second key point group. The first key point group is related to a relative position between the main body and the image capturing apparatus 150, and the second key point group is related to correctness of a posture, and detailed evaluating method thereof will be detailed in subsequent embodiments.

Figure 7:
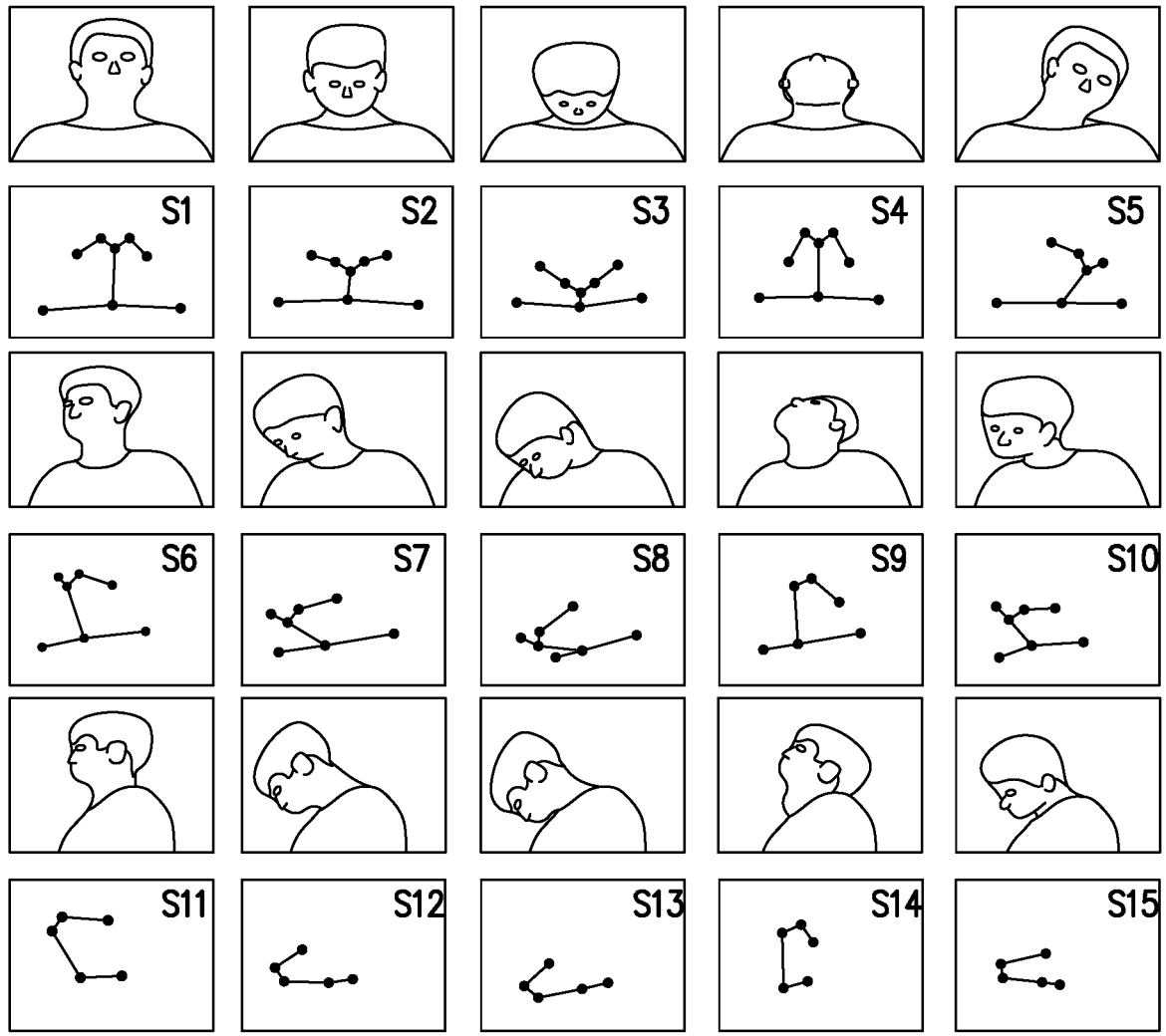
FIG. 7 is a schematic diagram of key point marks of a plurality of reading situations according to an embodiment of the disclosure.

Taking a reading situation as an example (but the disclosure is not limited thereto), FIG. 7 is a schematic diagram of key point marks of a plurality of reading situations according to an embodiment of the disclosure. Referring to FIG. 7, according to different habits of the users or an influence of the environment, under situations of different relative positions (for example, samples S1-S5 are situations that the main body faces the image capturing apparatus 150 with a front side, samples S6-S10 are situations that the main body faces the image capturing apparatus 150 with an oblique profile, and samples S11-S15 are situations that the main body faces the image capturing apparatus 150 completely with a profile), the geometric relation formed by the association of the key points may be different. The geometric relation may be related to connecting lines of the key points and/or angles, distances, ratios, relative positions, or relative directions of a geometric shape formed by the connecting lines due to locations thereof.

The processor 130 may determine a relative position between the main body and the image capturing apparatus 150 according to the first geometric relation (step S270). In an embodiment, the processor 130 may analyze a first reference geometric relation corresponding to the association of the first key point group from a known sample (an image where the relative position between the main body and the image capturing apparatus 150 has been confirmed), compare the first reference geometric relation with the first geometric relation, and determine the relative position between the main body in the image under test and the image capturing apparatus 150 based on the comparison result.

In an embodiment, the relative position between the main body and the image capturing apparatus 150 includes the front side and the oblique profile, and the first key point group includes positions of the shoulders and the neck. The processor 130 may define a first line and two second lines. The first line extends horizontally from the position of the neck or towards a shoulder. In an embodiment, when a connection between the positions of the two shoulders is a horizontal line (for example, relative to any reference horizontal plane), the first line extends horizontally from the position of the neck. In an embodiment, when the connection of the positions of the two shoulders is an oblique line, the first line extends from the position of the neck toward a direction of one shoulder.

On the other hand, the two second lines are respectively located on both sides of the first line in parallel and are spaced apart from the first line by an interval. For example, when the first line extends horizontally from the position of the neck, the two second lines are also horizontal lines. For another example, when the first line extends from the position of the neck toward a direction of one shoulder, the two second lines are parallel to the extending line but are not necessarily horizontal lines (depending on an inclination of the connection between the neck and the shoulder).

The processor 130 may determine whether the position of the shoulder is within a first range between the two second lines. In the embodiment, the first geometric relation is a position relation between the position of the shoulder and the first range. For example, the shoulder is located in the first range, or a distance between the shoulder and the first range. Namely, whether the left and right shoulders of the main body fall within the first range.

The processor 130 may determine whether the relative position is the front side or the oblique profile according to the first geometric relation. For example, FIG. 8A and FIG. 8B are schematic diagrams of front side recognition according to an embodiment of the disclosure. Referring to FIG. 8A, the connection between the positions of the two shoulders P2-1 and P2-2 is roughly horizontal, and the first line (taking an x-axis (or the horizontal line, and a y-axis is a vertical line) as an example) takes the position of the neck P1 as a start point (or a center point) and extends horizontally outward (for example, to the left and right sides in the drawing). Two second lines RH1 and RH2 are located above and below the x-axis (i.e., the first line). The second lines RH1 and RH2 are respectively parallel to the first line and are respectively spaced apart from the first line by intervals h1 and h2 (the values may be changed according to actual requirements). The processor 130 may set a range between the second lines RH1 and RH2 as the first range. Referring to FIG. 8B, the processor 130 may determine whether the shoulders P2-1 and P2-2 are located within the first range between the second lines RH1 and RH2. When the shoulders P2-1 and P2-2 are both within the first range, the processor 130 may determine that the relative position between the main body and the image capturing apparatus 150 is the front side. Namely, when the first line extends horizontally from the position of the neck P1, and the positions of the shoulders P2-1 and P2-2 are located within the first range between the two second lines RH1 and RH2, the processor 130 determines that the relative position is the front side. At this moment, the main body faces the image capturing apparatus 150 with the front side, and the shoulders thereof are roughly horizontal (as shown in FIG. 4). When the shoulders P2-1 and P2-2 are not within the first range, the processor 130 may determine that the main body does not face the image capturing apparatus 150 with the front side.

Regarding another example of the first geometric relation between the shoulder and the first range, FIG. 9A and FIG. 9B are schematic diagrams of oblique profile recognition according to an embodiment of the disclosure. Referring to FIG. 9A and FIG. 9B, the connection of the positions of the two shoulders P2-1 and P2-2 is substantially an oblique line, and the first line starts from the position of the neck P1 and extends toward the shoulder P2-1. The two second lines RH3 and RH4 are located diagonally above and diagonally below the first line. The second lines RH3 and RH4 are respectively parallel to the first line and are respectively spaced apart from the first line by intervals h3 and h4 (the values thereof may be changed according to actual requirements). The processor 130 may set a range between the second lines RH3 and RH4 as the first range. An included angle θ5 is formed between the line connecting the shoulder P2-1 and the neck P1 (taking the x-axis as an example) and the first line. The processor 130 may determine whether the shoulder P2-2 is located within the first range between the second lines RH3 and RH4. When the shoulder P2-2 is within the first range (or the included angle θ5 is smaller than an angle threshold (for example, 15, 30, or 45 degrees)), the processor 130 may determine that the relative position between the main body and the image capturing apparatus 150 is the oblique profile. Namely, when the first line extends from the position of the neck P1 toward the direction of the shoulder P2-1, and the position of the shoulder P2-1 is located within the first range between the two second lines RH3 and RH4, the processor 130 determines that the relative position is the oblique profile. At this time, the main body faces the image capturing apparatus 150 with the oblique profile, and the two shoulders are substantially inclined with respect to the horizontal line (as shown in FIG. 5). When the shoulder P2-2 is not within the first range (or the included angle θ5 is greater than the angle threshold), the processor 130 may determine that the main body does not face the image capturing apparatus 150 with the oblique profile.

In another embodiment, the first key point group includes the positions of the two shoulders and the neck, and the processor 130 may define a first ratio. The first ratio is a ratio of distances respectively between the two shoulders P2-1 and P2-2 and the neck P1. Namely, the ratio of the distances between the left shoulder and the right shoulder to the neck. In the embodiment, the first geometric relation is the first ratio.

Figure 10:
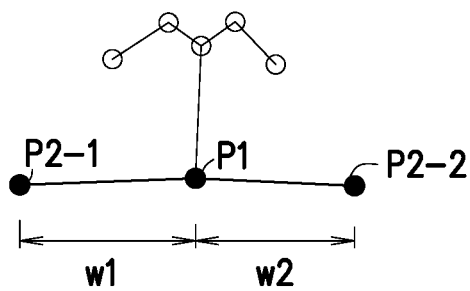
FIG. 10 is a schematic diagram of front side recognition according to another embodiment of the disclosure.

The processor 130 may determine whether the first ratio is within a first ratio interval, and determine whether the relative position is the front side or the oblique profile according to the first geometric relation. For example, FIG. 10 is a schematic diagram of front side recognition according to another embodiment of the disclosure. Referring to FIG. 10, a distance from the right shoulder P2-1 to the neck P1 is w1, and a distance from the left shoulder P2-2 to the neck P1 is w2. The processor 130 may set a reference ratio r1 and an error value b1 to form a value interval of the first ratio interval (i.e., r1−b1 (i.e., a difference between the reference ratio r1 and the error value b1) to r1+b1 (i.e., a sum of the reference ratio r1 and the error value b 1); in other words, the first ratio interval is greater than or equal to the difference between the reference ratio r1 and the error value b1, and the first ratio interval is less than or equal to the sum of the reference ratio r1 and the error value b1). The processor 130 may further determine whether the first ratio (for example, the distance w1 divided by the distance w2) is within the first ratio interval. When the first ratio is within the first ratio interval (i.e., r1−b1≤w1/w2≤r1+b1), the processor 130 may determine that the relative position between the main body and the image capturing apparatus 150 is the front side.

In a preferred embodiment, in the case of max{w1,w2}/min{w1,w2}≤1.1, the processor 130 may also determine that the relative position between the main body and the image capturing apparatus 150 is the front side, where max{w1,w2} refers to the maximum value of w1 and w2, and min{w1,w2} refers to the minimum value of w1 and w2.

Referring to FIG. 10 for another example of the first ratio of the shoulder to the neck, similarly, the processor 130 may still further determine whether the first ratio (for example, the distance w1 divided by the distance w2) is within the first ratio interval. When the first ratio is not within the first ratio interval (i.e., r1−b1>w1/w2 or w1/w2>r1+b1), the processor 130 may determine that the relative position between the main body and the image capturing apparatus 150 is the oblique profile.

Referring to FIG. 10 for another example of the first ratio of the shoulder to the neck, similarly, in the case of 1.1<max{w1,w2}/min{w1,w2}≤1+b, the processor 130 may also determine that the relative position between the main body and the image capturing apparatus 150 is the oblique profile. Where b>0.1, and the value of b may be, for example, varied according to a placement angle of the image capturing apparatus 150.

It should be noted that the reference ratio r1 and the error value b1 of the oblique profile are different from the corresponding values of the front side. For example, the reference ratio r1 (for example, 0.7 or 0.8) of the oblique profile may be smaller than the reference ratio r1 (for example, 1, or 1.2) of the front side. In addition, the error value is not limited to b1, or there may be two error values for the upper and lower limits of the first ratio interval.

In another embodiment, the processor 130 may determine the relative position between the main body and the image capturing apparatus 150 according to the number of the first key point group. The relative position between the main body and the image capturing apparatus 150 is the profile, and the first key point group includes the positions of one or two shoulders, one or two eyes, and one or two ears. The processor 130 may determine quantities of the shoulders, the eyes, and the ears. For example, whether each quantity is a specific value or whether it exceeds a range.

Figure 11:
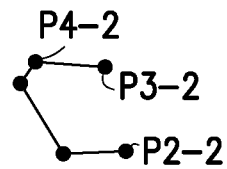
FIG. 11 is a schematic diagram of profile recognition according to another embodiment of the disclosure.

The processor 130 may determine the relative position between the main body and the image capturing apparatus 150 according to the quantities of the shoulders, the eyes, and the ears. For example, FIG. 11 is a schematic diagram of profile recognition according to another embodiment of the disclosure. Referring to FIG. 11, when the main body is the profile, the eye P4-2, the ear P3-2, and the shoulder P2-2 only correspond to one point each. Namely, the quantities of the eye P4-2, the ear P3-2, and the shoulder P2-2 are respectively one. Namely, when the quantities of the shoulder, the eye, and the ear are respectively one, the processor 130 determines that the relative position is the profile.

It should be noted that the aforementioned ranges, ratios, and quantities may be varied according to different situations, and are not limited by the embodiments of the disclosure. For example, factors such as a size of the main body and the distance with the image capturing apparatus 150 may change the aforementioned ranges, ratios, and quantities.

The processor 130 may compare a default geometric relation with a second geometric relation formed by association of the second key point group in the key points to generate a comparison result (step S290). To be specific, referring to FIG. 7 again, different orientations have different positional relations at the key points. Therefore, a specific relative position between the main body and the image capturing apparatus 150 has a corresponding normal posture determination rule. In an embodiment, each relative position has a corresponding default geometric relation. The processor 130 may analyze the corresponding default geometric relations between the key points based on the known samples (which have been confirmed as normal postures). Namely, the default geometric relation is defined in advance according to the association of the key points (i.e., the second key point group) when the main body is in the normal posture.

The processor 130 may correspondingly define the second geometric relation according to the type of the relative position. The second geometric relation includes positions of two key points in the second key point group, one or more connection lines formed by the positions of any two key points in the second key point group, a ratio of the two connection lines, or an angle, a ratio or a geometric relation between the connection lines and a third line. The third line is a reference line extending from one key point in the second key point group. The processor 130 may compare the default geometric relation with the second geometric relation (i.e., determine whether the second geometric relation satisfies the default geometric relation, and determine whether the main body in the image under test has a normal posture based on the comparison result.

In an embodiment, the default geometric relations of the normal postures derive angle analysis of the front side, the oblique profile and/or the profile.

Regarding the angle analysis of the front side (i.e. the relative position is the front side), in an embedment, the processor 130 may determine whether the connection line formed by two of the key points (i.e. the second key point group) is parallel to the horizontal line, and generates a comparison result accordingly. In the embodiment, the second key point group includes the positions of two eyes, the second geometric relation is a connection line of the positions of the two eyes, and the processor 130 may define the horizontal line as the default geometric relation. The horizontal line may be a horizontal line extending from the nose, the neck or other key points or a reference line of other angles.

Figure 12:
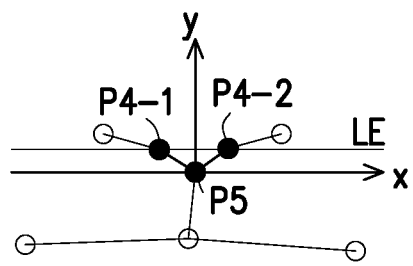
FIG. 12 is a schematic diagram of normal posture recognition of a front side according to an embodiment of the disclosure.

For example, FIG. 12 is a schematic diagram of normal posture recognition of the front side according to an embodiment of the disclosure. Referring to FIG. 12, the two eyes P4-1, P4-2 form a connection line LE. Under the normal posture, the connection line LE should be substantially parallel to the horizontal line (take the x-axis as an example). Namely, an included angle between the connection line LE and the horizontal line is approximately zero degree. When the comparison result is that the connection line LE is parallel to the horizontal line, the processor 130 determines that a front side orientation of the main body in the image under test is the normal posture. When the comparison result is that the connection line LE is not parallel to the horizontal line, the processor 130 determines that the front side orientation of the main body in the image under test is not the normal posture (which is collectively referred to as a poor posture hereinafter).

Figure 13:
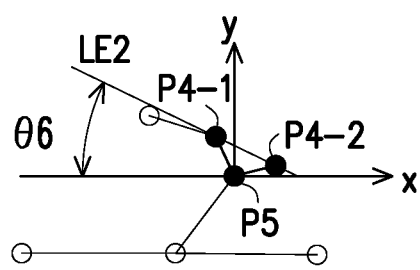
FIG. 13 is a schematic diagram of normal posture recognition of the front side according to another embodiment of the disclosure.

FIG. 13 is a schematic diagram of normal posture recognition of the front side according to another embodiment of the disclosure. Referring to FIG. 13, when a head portion of the main body is tilted, the connection line formed by the eyes P4-1 and P4-2 is not parallel to the horizontal line. Namely, an included angle θ6 between a connection line LE2 formed by the two eyes P4-1 and P4-2 and the horizontal line (taking the x-axis as an example) is greater than zero degree or even greater than other angles. Therefore, the processor 130 may set the angle interval as 0-10 degrees, 0-15 degrees or other ranges. For example, the processor 130 takes the highest, the second highest, the lowest, the second lowest, or an average, a median or other representative numbers of any one or more of the above in the known sample as an upper limit and/or a lower limit of the angle interval. When the comparison result is that the included angle θ6 between the connection line LE2 and the horizontal line is within the angle interval, the processor 130 determines that a front side orientation of the main body in the image under test is the normal posture. When the comparison result is that the included angle θ6 between the connection line LE2 and the horizontal line is not within the angle interval, the processor 130 determines that the front side orientation of the main body in the image under test is a poor posture.

Regarding the front side angle analysis, in another embodiment, the second key point group includes the positions of the two eyes and the two ears, and the processor 130 may determine whether the positions of the two ears are located in a second range formed according to the two eyes, and accordingly generate a comparison result. In the embodiment, the second geometric relation is a position relation between the two ears and the second range, for example, whether any one or both of the ears are located in the second range or a relative distance or relative direction from the second range. The processor 130 may define a space between the connection line formed by the positions of the two eyes and the reference line parallel to the connection line as the second range. Namely, the second range is located between the connection line of the two eyes and the reference line. It is should be noted that the second range is a default geometric relation. The processor 130 may determine a shape and a size of the second range based on the key points in the known sample that are determined to be frontal and normal posture.

For example, FIGS. 14A and 14B are schematic diagrams of normal posture recognition of the front side according to another embodiment of the disclosure. Referring to FIG. 14A, a fourth line RH5 is formed at a distance h5 (a value thereof may be changed according to actual requirements) above the connection line LE3 of the two eyes P4-1 and P4-2, and the second range is formed between the connection line LE3 and the fourth line RH5. Referring to FIG. 14B, the processor 130 may determine whether the two ears P3-1 and P3-2 are located within the second range formed by the connection line LE3 and the fourth line RH5. When the comparison result is that the two ears P3-1 and P3-2 are located within the second range, the processor 130 determines that the front side orientation of the main body in the image under test is the normal posture. When the comparison result is that the two ears P3-1 and P3-2 are not within the second range (probably due to that an angle that the main body lowers the head is too large), the processor 130 determines that the front side orientation of the main body in the image under test is the poor posture.

Regarding the front side angle analysis, in another embodiment, the second key point group includes the positions of the neck, the nose, and the two shoulders. The processor 130 may define a second ratio. The second ratio is a ratio of a first distance to a second distance. The first distance is a distance from the nose to the neck, and the second distance is the shortest distance (or vertical distance) between the two shoulders. The processor 130 may determine whether the second ratio is within a second ratio interval, and accordingly generate a comparison result. In the embodiment, the second geometric relation is the second ratio, and the second ratio of the normal posture is located within the second ratio interval (which may be different from the first ratio interval corresponding to the first ratio). Namely, the second ratio interval is a default geometric relation. The processor 130 may set a reference ratio r2 and an error value b2 based on the key points in the known sample that are determined to be normal posture, so as to form the second ratio interval (i.e., a value interval from r2−b2 (i.e., a difference between the reference ratio r2 and the error value b2) to r2+b2 (i.e., a sum of the reference ratio r2 and the error value b2)).

For example, FIG. 15 is a schematic diagram of normal posture recognition of the front side according to another embodiment of the disclosure. Referring to FIG. 15, a distance between the nose P5 and the neck P1 is h6, and a distance between the shoulders P2-1 and P2-2 is w3. The processor 130 may further determine whether a second ratio (for example, the distance h6 divided by the distance w3) is within the second ratio interval (r2−b2 to r2+b2, i.e., the second ratio interval is greater than or equal to the difference between the reference ratio r2 and the error value b2, and the second ratio interval is smaller than or equal to the sum of the reference ratio r2 and the error value b2). When the comparison result is that the second ratio is within the second ratio interval (i.e., r2−b2≤h6/w3≤r2+b2), the processor 130 may determine that the front side orientation of the main body in the image under test is the normal posture. When the comparison result is that the second ratio is not within the second ratio interval (i.e., r2−b2>h6/w3 or h6/w3>r2+b2), the processor 130 may determine that the front side orientation of the main body in the image under test is the poor posture (for example, a situation that the main body is hunched or leaning up). It should be noted that the error value is not limited to b2, or there may be two error values for the upper and lower limits of the second ratio interval.

Regarding the oblique profile angle analysis (i.e. the relative position is the oblique profile), in an embodiment, the processor 130 may define an included angle between a connection line formed by two of the key points (i.e., the second key point group) and the third line. In the embodiment, the second key point group includes the positions of the neck and the nose, and the processor 130 may define a connection line formed by the position of the neck and the position of the nose. The third line is a horizontal line, and the second geometric relation is the included angle, and the default geometric relation is a default angle interval. The processor 130 may determine the default angle interval according to the included angle corresponding to the oblique profile and the normal posture in the known sample. For example, the processor 130 takes the highest, the second highest, the lowest, the second lowest, or an average, a median or other representative numbers of any one or more of the above in the known sample as an upper limit and/or a lower limit of the angle interval.

The processor 130 may determine whether the included angle satisfies the default geometric relation. For example, FIG. 16A and FIG. 16B are schematic diagrams of normal posture recognition of an oblique profile according to an embodiment of the disclosure. Referring to FIG. 16A, the processor 130 may set a horizontal line (i.e., the third line that takes the x-axis as an example, and the neck P1 is taken as a center point) as a reference angle interval (for example, angles $\theta 7$ and $\theta 8$). The angle interval is related to an allowable downward inclination angle of the neck P1. Referring to FIG. 16B, the processor 130 may determine whether an included angle $\theta 9$ between the connection line of the neck P1 and the nose P5 and the horizontal line is within the angle interval. When the comparison result is that the included angle $\theta 9$ is within the angle interval, the processor 130 determines that an oblique profile orientation of the main body in the image under test is a normal posture. When the comparison result is that the included angle $\theta 9$ is not within the angle interval, the processor 130 determines that the oblique profile orientation of the main body in the image under test is a poor posture.

Regarding the oblique profile angle analysis, in another embodiment, the second key point group is the positions of the eyes and ears, and the processor 130 may define the connection line formed by the position of the eye and the position of the ear, and define an included angle between the connection line and the third line. In the embodiment, the third line is the horizontal line, the second geometric relation is the included angle between the connection line formed by the position of the eye and the position of the ear and the third line, and the default geometric relation is a default angle interval.

Figure 17A:
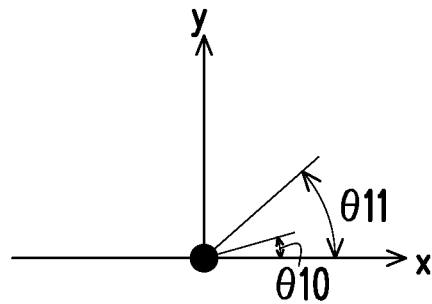
FIG. 17A and FIG. 17B are schematic diagrams of normal posture recognition of the oblique profile according to another embodiment of the disclosure.
Figure 17B:
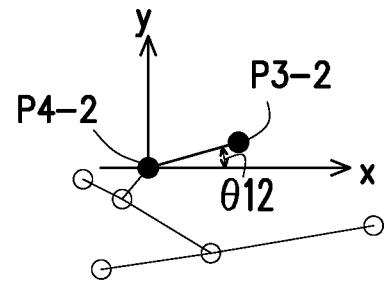

The processor 130 may determine whether the included angle satisfies the default geometric relation to accordingly generate a comparison result. For example, FIG. 17A and FIG. 17B are schematic diagrams of normal posture recognition of the oblique profile according to another embodiment of the disclosure. Referring to FIG. 17A, the processor 130 may set a horizontal line (i.e., the third line that takes the x-axis as an example, and the eye P4-2 is taken as a center point) as a reference angle interval (for example, angles $\theta 10$ and $\theta 11$). The angle interval is related to an allowable downward inclination angle of the neck P1. Referring to FIG. 17B, the processor 130 may determine whether an included angle $\theta 12$ between the connection line of the eye P4-2 and the ear P3-2 and the horizontal line is within the angle interval. When the comparison result is that the included angle $\theta 12$ is within the angle interval, the processor 130 determines that the oblique profile orientation of the main body in the image under test is the normal posture. When the comparison result is that the included angle $\theta 12$ is not within the angle interval, the processor 130 determines that the oblique profile orientation of the main body in the image under test is a poor posture.

It should be noted that FIG. 17A and FIG. 17B may also present the connection line between the eye P4-1 and the ear P3-1, and the horizontal line is based on the eye P4-1.

Regarding profile angle analysis (i.e., the relative position is the profile), in an embodiment, the processor 130 may also define the included angle between the connection line formed by two of the key points (i.e. the second key point group) and the third line. In the embodiment, the second key point group includes the positions of the neck and the nose, and the processor 130 may define the connection line formed by the position of the eye and the position of the ear. The third line is a horizontal line, the second geometric relation is the included angle between the connection line and the third line, and the default geometric relation is a default angle interval.

Figure 18:
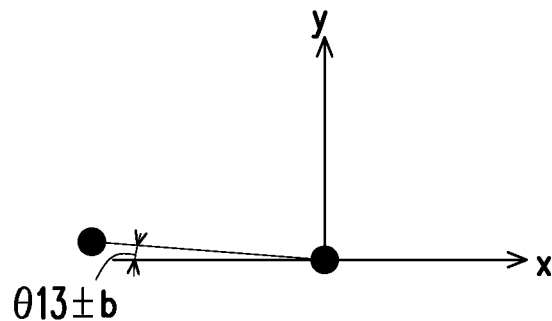
FIG. 18 is a schematic diagram of normal posture recognition of a profile according to an embodiment of the disclosure.

The processor 130 may determine whether the included angle satisfies the default geometric relation, and accordingly generate a comparison result. For example, FIG. 18 is a schematic diagram of normal posture recognition of the profile according to an embodiment of the disclosure. Referring to FIG. 18, the processor 130 may set an angle tolerance b and an angle $\theta 13$, and determine whether an included angle between the connection line formed by the neck P1 and the nose P5 and the horizontal line (i.e. the third line that takes the x-axis as an example, and the neck P1 is taken as a center point) is within in an angle interval (angle $\theta 13-b$~angle $\theta 13+b$). When the comparison result is that the included angle between the connection line formed by the neck P1 and the nose P5 and the horizontal line is within the angle interval, the processor 130 determines that a profile orientation of the main body in the image under test is a normal posture. When the comparison result is that the included angle between the connection line formed by the neck P1 and the nose P5 and the horizontal line is not within the angle interval, the processor 130 determines that the profile orientation of the main body in the image under test is a poor posture.

Regarding the profile angle analysis, in another embodiment, the second key point group is the positions of the eyes and ears, and the processor 130 may define the connection line formed by the position of the eye and the position of the ear, and define an included angle between the connection line and the third line. In the embodiment, the third line is the horizontal line, the second geometric relation is the included angle between the connection line formed by the position of the eye and the position of the ear and the third line, and the default geometric relation is a default angle interval.

Figure 19A:
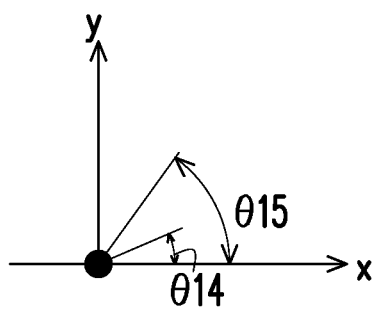
FIG. 19A and FIG. 19B are schematic diagrams of normal posture recognition of the profile according to another embodiment of the disclosure.
Figure 19B:
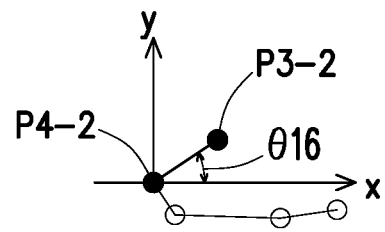

The processor 130 may determine whether the included angle satisfies the default geometric relation to accordingly generate a comparison result. For example, FIG. 19A and FIG. 19B are schematic diagrams of normal posture recognition of the profile according to another embodiment of the disclosure. Referring to FIG. 19A, the processor 130 may set a horizontal line (i.e., the third line that takes the x-axis as an example, and the eye P4-2 is taken as a center point) as a reference angle interval (for example, angles θ14 and θ15). The angle interval is related to an allowable downward inclination angle of the neck P1. Referring to FIG. 19B, the processor 130 may determine whether an included angle θ16 between the connection line of the eye P4-2 and the ear P3-2 and the horizontal line is within the angle interval. When the comparison result is that the included angle θ16 is within the angle interval, the processor 130 determines that the profile orientation of the main body in the image under test is the normal posture. When the comparison result is that the included angle θ16 is not within the angle interval, the processor 130 determines that the profile orientation of the main body in the image under test is a poor posture.

It should be noted that FIG. 19A and FIG. 19B may also present the connection line between the eye P4-1 and the ear P3-1, and the horizontal line is based on the eye P4-1.

In addition, according to different situations, the aforementioned range, ratio, and angle interval may be varied, and are not limited by the embodiments of the disclosure. For example, factors such as the size of the main body and the distance with the image capturing apparatus 150 may change the aforementioned range, ratio, and angle interval.

Regardless of normal or poor reading or viewing posture, when maintaining a fixed posture for a long time, human body may feel tired. Therefore, statistical analysis of individual postures may be made to provide different warnings. In an embodiment, the processor 130 may issue a warning based on accumulative numbers of times of the comparison result and a second comparison result. The comparison result and the second comparison result are normal posture or poor posture. The accumulative number of times is a statistical number of times that the comparison result and the second comparison result are the normal posture or the abnormal posture (i.e., the poor posture). The second comparison result is related to the comparison result obtained by comparing one or more second images under test with the normal posture, and image capturing time of the image under test and the second image under test may be different. For example, the image capturing apparatus 150 captures an image every 10 seconds, every 30 seconds or every one minute to serve as the image under test or the second image under test. In addition, the accumulative number of times required for sending the warnings may be related to the image capturing time, statistical time, health education information, or other requirements.

Figure 20:
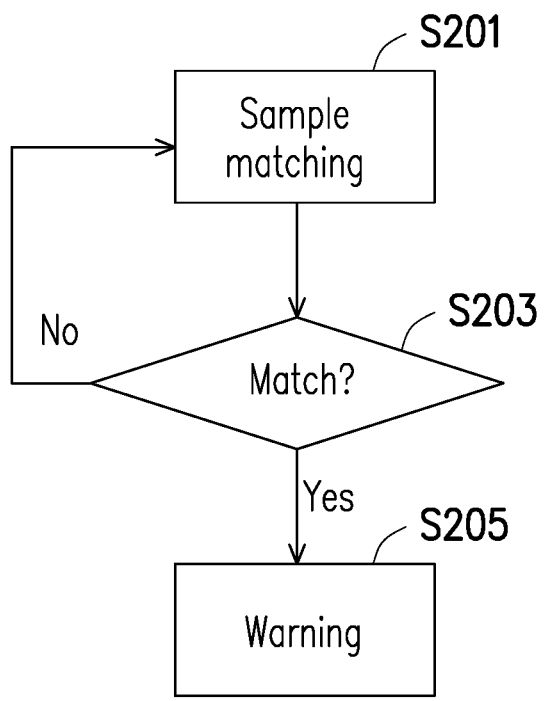
FIG. 20 is a flowchart of warning according to an embodiment of the disclosure.

FIG. 20 is a flowchart of warning according to an embodiment of the disclosure. Referring to FIG. 20, the processor 130 performs sample matching on the image under test or the second image under test (step S201). For example, the processor 130 takes an image determined as a normal posture as a positive sample, and an image determined as a poor posture as a negative sample, and accordingly counts an accumulative number of times of the positive samples and the negative samples respectively. The processor 130 may determine whether the accumulative number of times meets a warning requirement (for example, the accumulative number of times is greater than a specific number of times, or whether the accumulative number of times within a specific time period reaches a specific number of times) (step S203). When the accumulative number of times meets the warning requirement, the processor 130 may send a warning (step S205). The warning is, for example, a reminder related to sound, light, or a combination thereof, for example, to flash lights of a specific color, or send a warning tone. When the cumulative number of times does not meet the warning requirement, the processor 130 continues to count the accumulative number of times.

In another embodiment, the processor 130 may also send a warning when detecting a negative sample.

In summary, according to the posture evaluating apparatus, method and system of the embodiments of the disclosure, the position relation of several key points of the main body in the image under test is analyzed to determine the orientation of the main body relative to the image capturing apparatus, and determine whether the main body with a specific orientation is in a normal posture. The position relation may be the angle, distance or ratio formed by the key points and/or connection lines thereof. In this way, the accuracy and efficiency of posture evaluation may be improved.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A posture evaluating method, comprising:
   capturing an image under test by using an image capturing apparatus;
   identifying a plurality of key points in the image under test, wherein the key points correspond to a plurality of positions of a main body in the image under test and comprise a first key point group and a second key point group;
   obtaining a position of the first key point group, and defining a first geometric relation via association of the first key point group;
   determining a relative position between the main body and the image capturing apparatus according to the first geometric relation, wherein each of the relative position has a corresponding default geometric relation; and
   comparing the default geometric relation and a second geometric relation formed by association of the second key point group to generate a comparison result, wherein: the relative position comprises a front side, an oblique profile, and a profile; and comparing the default geometric relation corresponding to each of the relative position and the second geometric relation formed by association of the second key point group comprises:
   correspondingly defining the second geometric relation according to a type of the relative position, wherein the second geometric relation comprise positions of two key points in the second key point group, at least one connection line formed by positions of any two key points in the second key point group, a ratio of two of the connection lines, or an angle, a ratio or a geometric relation between the at least one connection line and a third line, and the third line is a reference line extending from one key point in the second key point group; and
   determining whether the second geometric relation satisfies the default geometric relation.

2. The posture evaluating method as claimed in claim 1, wherein identifying the key points in the image under test comprises:
   marking the key points in the image to be tested based on a neural network, wherein the neural network is trained by learning samples marked with the key points.

3. The posture evaluating method as claimed in claim 1, further comprising:
   determining whether the main body is in a normal posture according to the comparison result, wherein the default geometric relation is defined in advance by association of the key points when the main body is in the normal posture;

wherein after determining whether the main body is in the normal posture based on the comparison result, the posture evaluating method further comprises:

sending a warning based on an accumulative number of times of the comparison result and a second comparison result, wherein the accumulative number of times is a statistical number of times that the comparison result and the second comparison result are the normal posture or not the normal posture, the second comparison result is related to at least one second image under test, and a capturing time of the image under test is different from that of the at least one second image under test.

4. The posture evaluating method as claimed in claim 1, wherein: the first key point group located on the main body comprises positions of two shoulders and a neck; and determining the relative position between the main body and the image capturing apparatus comprises:

defining a first line and two second lines, wherein the first line extends horizontally from the position of the neck or extends toward a direction of one of the shoulders, the two second lines are respectively located on two sides of the first line in parallel and spaced apart from the first line by an interval;

determining whether the position of one of the shoulders is located in a first range between the two second lines, and the first geometric relation is a position relation between the position of the shoulders and the first range; and determining whether the relative position is the front side or the oblique profile according to the first geometric relation;

wherein determining that the first line extends horizontally from the position of the neck, wherein a connection of the positions of the two shoulders is a horizontal line;

wherein determining that the first line extends from the position of the neck toward the direction of one of the shoulders, wherein the connection of the positions of the two shoulders is an oblique line;

wherein determining whether the relative position is the front side or the oblique profile according to the first geometric relation comprises:

determining that the position of the shoulders is located in the first range between the two second lines, and further determining that the relative position is the front side, wherein the first line extends horizontally from the position of the neck; and determining that the position of the shoulders is located in the first range between the two second lines, and further determining that the relative position is the oblique profile, wherein the first line extends from the position of the neck toward the direction of one of the shoulders.

5. The posture evaluating method as claimed in claim 1, wherein: the first key point group located on the main body comprises positions of two shoulders and a neck; and determining the relative position between the main body and the image capturing apparatus comprises:

defining a first ratio, wherein the first ratio is a ratio of two distances respectively between the two shoulders and the neck;

determining whether the first ratio is within a first ratio interval, wherein the first geometric relation is the first ratio; and determining whether the relative position is the front side or the oblique profile according to the first geometric relation;

wherein the first ratio interval is greater than or equal to a difference between a reference ratio and a first error value, and the first ratio interval is less than or equal to a sum of the reference ratio and a second error value, and the method further comprises:

determining that the relative position is the front side, wherein the first ratio is within the first ratio interval; and determining that the relative position is the oblique profile, wherein the first ratio is not within the first ratio interval.

6. The posture evaluating method as claimed in claim 1, further comprising:

determining the relative position between the main body and the image capturing apparatus according to a quantity of the first key point group;

wherein the first key point group located on the main body comprises positions of at least one shoulder, at least one eye, and at least one ear; and determining the relative position between the main body and the image capturing apparatus comprises:

determining quantities of the at least one shoulder, the at least one eye, and the at least one ear;

determining the relative position between the main body and the image capturing apparatus according to the quantities of the at least one shoulder, the at least one eye, and the at least one ear; and determining that the relative position is the profile, wherein the quantities of the at least one shoulder, the at least one eye, and the at least one ear are respectively one.

7. The posture evaluating method as claimed in claim 1, wherein: when the relative position is the front side, and the second key point group comprises positions of two eyes; and comparing the default geometric relation and the second geometric relation formed by association of the second key point group comprises:

defining a horizontal line as the default geometric relation;

determining whether the connection line formed by the positions of the two eyes is parallel to the horizontal line, wherein the connection line formed by the positions of the two eyes is the second geometric relation; and producing the comparison result;

when the relative position is the front side, and the second key point group comprises positions of two eyes and two ears; and comparing the default geometric relation and the second geometric relation formed by association of the key points comprises:

defining a second range between the connection line formed by the positions of the two eyes and a reference line parallel to the connection line, wherein the second range is the default geometric relation;

determining whether the positions of the two ears are in the second range, wherein the positions of the two ears are the second geometric relation; and producing the comparison result.

8. The posture evaluating method as claimed in claim 1, wherein: the relative position is the front side, and the second key point group comprises positions of a neck, a nose, and two shoulders; and comparing the default geometric relation and the second geometric relation formed by association of the second key point group comprises:

defining a second ratio, wherein the second ratio is a ratio of a first distance to a second distance, wherein the first distance is a distance from the nose to the neck, and the second distance is a distance between the two shoulders, and the second geometric relation is the second ratio;

determining whether the second ratio is within a second ratio interval, wherein the second ratio interval is the default geometric relation; and producing the comparison result;

wherein the second ratio interval is greater than or equal to a difference between a reference ratio and a third error value, and the second ratio interval is less than or equal to a sum of the reference ratio and a fourth error value.

9. The posture evaluating method as claimed in claim 1 wherein: when the relative position is the oblique profile or the profile, the second key point group comprises positions of a neck and a nose; and comparing the default geometric relation and the second geometric relation formed by association of the key points comprises:

defining the connection line formed by the position of the neck and the position of the nose;

defining the included angle between the connection line and the third line, wherein the third line is a horizontal line, and the included angle is the second geometric relation;

determining whether the included angle satisfies the default geometric relation, wherein the default geometric relation is a default angle interval; and producing the comparison result;

when the relative position is the oblique profile or the profile, the second key point group comprises a position of an eye and a position of an ear; and comparing the default geometric relation and the second geometric relation formed by association of the key points comprises:

defining the connection line formed by the position of the eye and the position of the ear;

defining the included angle between the connection line and the third line, wherein the third line is a horizontal line, and the included angle is the second geometric relation;

determining whether the included angle satisfies the default geometric relation, wherein the default geometric relation is a default angle interval; and producing the comparison result.

10. The posture evaluating method as claimed in claim 1, wherein before identifying the key points in the image under test, the posture evaluating method further comprises:

expanding a fisheye image into a panoramic image, and taking the panoramic image as the image under test.

11. A posture evaluating apparatus, comprising:

a memory, storing a program code; and a processor, coupled to the memory, loading and executing the program code to:

identify a plurality of key points in an image under test, wherein the image under test is captured by an image capturing apparatus, the key points correspond to a plurality of positions of a main body in the image under test and comprise a first key point group and a second key point group;

obtain a position of the first key point group, and define a first geometric relation via association of the first key point group;

determine a relative position between the main body and the image capturing apparatus according to the first geometric relation, wherein each of the relative position has a corresponding default geometric relation; and compare the default geometric relation and a second geometric relation formed by association of the second key point group to generate a comparison result, wherein the relative position comprises a front side, an oblique profile, and a profile, and the processor is further configured to:

correspondingly define the second geometric relation according to a type of the relative position, wherein the second geometric relation comprise positions of two key points in the second key point group, at least one connection line formed by positions of any two key points in the second key point group, a ratio of two of the connection lines, or an angle, a ratio or a geometric relation between the at least one connection line and a third line, and the third line is a reference line extending from one key point in the second key point group; and determine whether the second geometric relation satisfies the default geometric relation.

12. The posture evaluating apparatus as claimed in claim 11, wherein the processor is further configured to:

mark the key points in the image to be tested based on a neural network, wherein the neural network is trained by learning samples marked with the key points.

13. The posture evaluating apparatus as claimed in claim 11, wherein the processor is further configured to:

determine whether the main body is in a normal posture according to the comparison result, wherein the default geometric relation is defined in advance by association of the key points when the main body is in the normal posture;

wherein the processor is further configured to:

send a warning based on an accumulative number of times of the comparison result and a second comparison result, wherein the accumulative number of times is a statistical number of times that the comparison result and the second comparison result are the normal posture or not the normal posture, the second comparison result is related to at least one second image under test, and a capturing time of the image under test is different from that of the at least one second image under test.

14. The posture evaluating apparatus as claimed in claim 11, wherein the first key point group located on the main body comprises positions of two shoulders and a neck, and the processor is further configured to:

define a first line and two second lines, wherein the first line extends horizontally from the position of the neck or extends toward a direction of one of the shoulders, the two second lines are respectively located on two sides of the first line in parallel and spaced apart from the first line by an interval;

determine whether the position of one of the shoulders is located in a first range between the two second lines, and the first geometric relation is a position relation between the position of the shoulders and the first range; and determine whether the relative position is the front side or the oblique profile according to the first geometric relation;

wherein the processor is further configured to:

determine that the position of the shoulders is located in the first range between the two second lines, and further determine that the relative position is the front side, wherein the first line extends horizontally from the position of the neck; and determine that the position of the shoulders is located in the first range between the two second lines, and further determine that the relative position is the oblique profile, wherein the first line extends from the position of the neck toward the direction of one of the shoulders;

wherein the processor is further configured to:

determine that the first line extends horizontally from the position of the neck, wherein a connection of the positions of the two shoulders is a horizontal line; and determine that the first line extends from the position of the neck toward the direction of one of the shoulders, wherein the connection of the positions of the two shoulders is an oblique line.

15. The posture evaluating apparatus as claimed in claim 11, wherein the first key point group located on the main body comprises positions of two shoulders and a neck, and the processor is further configured to:

define a first ratio, wherein the first ratio is a ratio of two distances respectively between the two shoulders and the neck;

determine whether the first ratio is within a first ratio interval, wherein the first geometric relation is the first ratio; and determine whether the relative position is the front side or the oblique profile according to the first geometric relation;

wherein the first ratio interval is greater than or equal to a difference between a reference ratio and a first error value, and the first ratio interval is less than or equal to a sum of the reference ratio and a second error value, and the processor is further configured to:

determine that the relative position is the front side, wherein the first ratio is within the first ratio interval; and determine that the relative position is the oblique profile, wherein the first ratio is not within the first ratio interval.

16. The posture evaluating apparatus as claimed in claim 11, wherein the processor is further configured to:

determine the relative position between the main body and the image capturing apparatus according to a quantity of the first key point group;

wherein the first key point group located on the main body comprises positions of at least one shoulder, at least one eye, and at least one ear, and the processor is further configured to:

determine quantities of the at least one shoulder, the at least one eye, and the at least one ear;

determine the relative position between the main body and the image capturing apparatus according to the quantities of the at least one shoulder, the at least one eye, and the at least one ear; and determine that the relative position is the profile, wherein the quantities of the at least one shoulder, the at least one eye, and the at least one ear are respectively one.

17. The posture evaluating apparatus as claimed in claim 11, wherein when the relative position is the front side, and the second key point group comprises positions of two eyes, and the processor is further configured to:

define a horizontal line as the default geometric relation;

determine whether the connection line formed by the positions of the two eyes is parallel to the horizontal line, wherein the connection line formed by the positions of the two eyes is the second geometric relation; and produce the comparison result;

when the relative position is the front side, and the second key point group comprises positions of two eyes and two ears, and the processor is further configured to:

define a second range between the connection line formed by the positions of the two eyes and a reference line parallel to the connection line, wherein the second range is the default geometric relation;

determine whether the positions of the two ears are in the second range, wherein the positions of the two ears are the second geometric relation; and produce the comparison result.

18. The posture evaluating apparatus as claimed in claim 11, wherein the relative position is the front side, and the second key point group comprises positions of a neck, a nose, and two shoulders, and the processor is further configured to:

define a second ratio, wherein the second ratio is a ratio of a first distance to a second distance, wherein the first distance is a distance from the nose to the neck, and the second distance is a distance between the two shoulders, and the second geometric relation is the second ratio;

determine whether the second ratio is within a second ratio interval, wherein the second ratio interval is the default geometric relation; and produce the comparison result;

wherein the second ratio interval is greater than or equal to a difference between a reference ratio and a third error value, and the second ratio interval is less than or equal to a sum of the reference ratio and a fourth error value.

19. The posture evaluating apparatus as claimed in claim 11, wherein when the relative position is the oblique profile or the profile, the second key point group comprises positions of a neck and a nose, and the processor is further configured to:

define the connection line formed by the position of the neck and the position of the nose;

define the included angle between the connection line and the third line, wherein the third line is a horizontal line, and the included angle is the second geometric relation;

determine whether the included angle satisfies the default geometric relation, wherein the default geometric relation is a default angle interval; and produce the comparison result;

when the relative position is the oblique profile or the profile, the second key point group comprises positions of an eye and an ear, and the processor is further configured to:

define the connection line formed by the position of the eye and the position of the ear;

define the included angle between the connection line and the third line, wherein the third line is a horizontal line, and the included angle is the second geometric relation;

determine whether the included angle satisfies the default geometric relation, wherein the default geometric relation is a default angle interval; and produce the comparison result.

20. A posture evaluating system, comprising:
an image capturing apparatus, capturing an image under test;
a memory, storing a program code; and
a processor, coupled to the memory and the image capturing apparatus, and loading and executing the program code to:
identify a plurality of key points in the image under test, wherein the image under test is captured by the image capturing apparatus, the key points correspond to a plurality of positions of a main body in the image under test and comprise a first key point group and a second key point group;
obtain a position of a first key point group, and define a first geometric relation via association of the first key point group;
determine a relative position between the main body and the image capturing apparatus according to the first geometric relation, wherein each of the relative position has a corresponding default geometric relation; and
compare the default geometric relation and a second geometric relation formed by association of the second key point group to generate a comparison result, wherein the relative position comprises a front side, an oblique profile, and a profile, and the processor is further configured to:
correspondingly define the second geometric relation according to a type of the relative position, wherein the second geometric relation comprise positions of two key points in the second key point group, at least one connection line formed by positions of any two key points in the second key point group, a ratio of two of the connection lines, or an angle, a ratio or a geometric relation between the at least one connection line and a third line, and the third line is a reference line extending from one key point in the second key point group; and
determine whether the second geometric relation satisfies the default geometric relation.

\* \* \* \* \*